United States Patent [19]

Cataldo et al.

[11] 4,245,902
[45] Jan. 20, 1981

[54] BANK DEPOSIT IDENTIFICATION DEVICE

[76] Inventors: Joseph W. Cataldo, c/o George Spector, 3615 Woolworth Bldg., 233 Broadway; George Spector, 3615 Woolworth Bldg., 233 Broadway, both of New York, N.Y. 10007

[21] Appl. No.: 952,480

[22] Filed: Oct. 18, 1978

[51] Int. Cl.³ .............................................. G03B 29/00
[52] U.S. Cl. ...................................... 354/76; 346/22; 346/107 C
[58] Field of Search ................... 354/75, 76, 80, 81, 354/220; 346/22, 107 C; 109/23, 24.1; 194/4 B; 340/568-572; 358/108; 352/131, 133, 179, 243

[56] References Cited

U.S. PATENT DOCUMENTS

| | | | |
|---|---|---|---|
| 1,890,941 | 12/1932 | Flagg | 340/568 X |
| 2,109,361 | 2/1938 | Spiegel | 109/23 X |
| 2,721,497 | 10/1955 | Warren | 354/109 |
| 2,908,223 | 4/1961 | Stidham | 346/22 X |
| 2,909,107 | 10/1959 | Simjian | 346/22 |

Primary Examiner—John Gonzales

[57] ABSTRACT

An apparatus for confirming a bank deposit having been actually done at a bank night depository chute, thus eliminating subsequent contradiction of the unwitnessed deposit between the bank and the depositor, the apparatus including a dual camera that is activated to operate when the chute door is unlocked, so a forward extending lens photographs the face of the depositor, and another lens, pointing into the chute, photographs the package deposited into the chute, the invention also including another design in which the dual camera is of movie camera type that records the entire operation inside the chute from the amount of the chute door opening to the closing thereof so to indicate if the package is removed again before door closing, and the apparatus including auxillary, spaced apart still camera all pointed at the depositor so to prevent easy covering of the lens.

2 Claims, 5 Drawing Figures

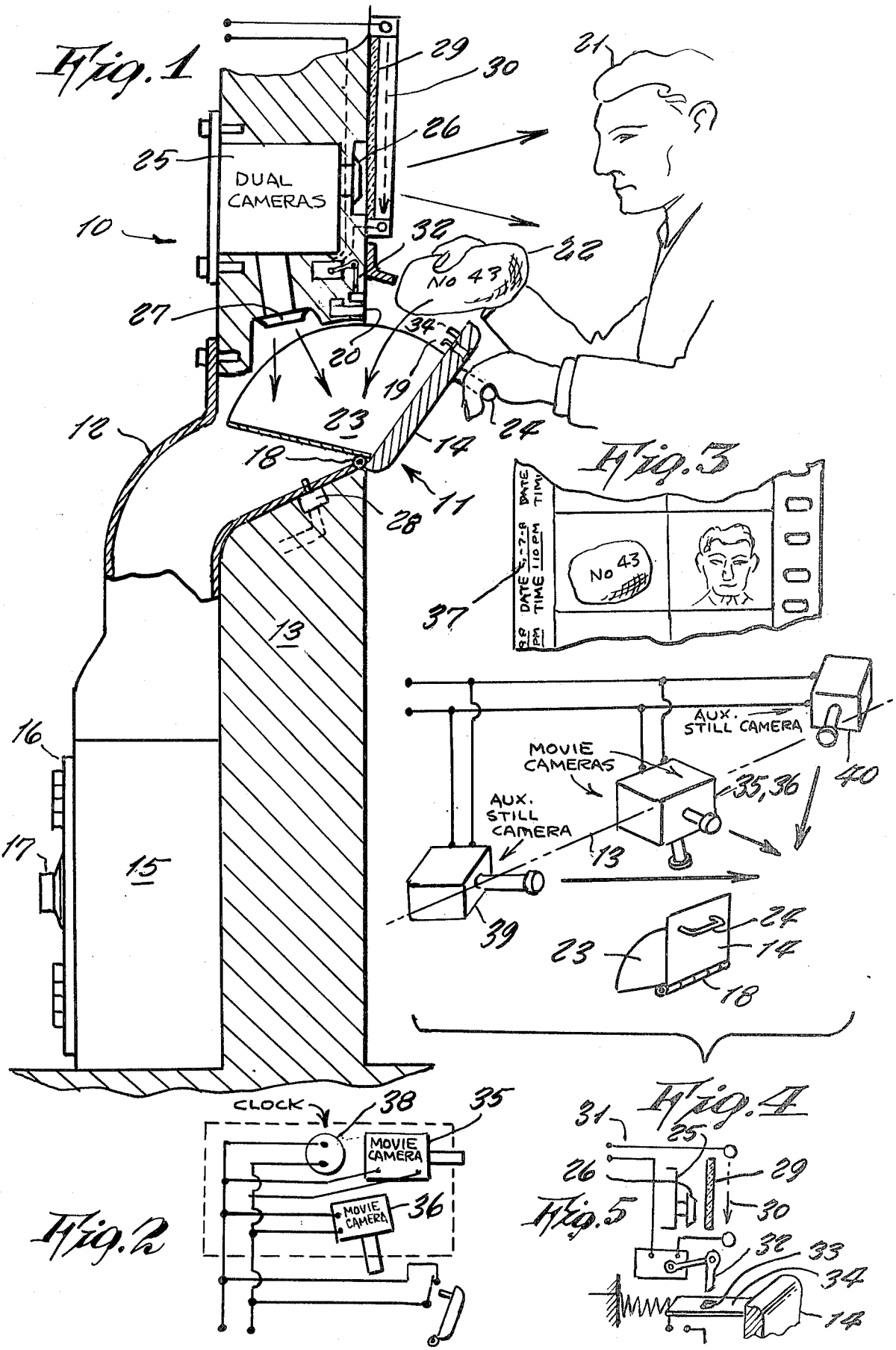

BANK DEPOSIT IDENTIFICATION DEVICE

This invention relates generally to bank night depositories.

It is well known in the security field that in the past years, law enforcement investigators are called in to investigate numerous occassions of reported losses of thousands of dollars made by large retail stores when making night deposits dropped into night depository chutes of banks. The banks contend that they have not received the deposits, while the depositors contend that they have made the drop. This results in alarming differences between the banks and their clients. Records show apprehensions of guilty persons sometimes being a store employee assigned to make the drop or the bank manager or other personel. This situation is objectionable and is therefore in want of an improvement.

Accordingly, it is a principal object of the present invention to provide an apparatus incorporated into the construction of a bank night depository which identifies visually the depositor and also positively confirms whether a deposit is being actually made.

Another object is to provide an apparatus which will accordingly stop crime at this point so that missing deposit money can be confined to elsewhere investigation.

Yet another object is to provide an apparatus which will eliminate the time and money spent investigating for such crime, and which will promote honesty for all persons associated with work regarding night depositories.

FIG. 1 is a side view of the invention installed in a bank wall, and shown in operative use.

FIG. 2 is an electric circuit thereof, and showing an additional protective feature by the cameras being movie cameras so to record continuously a customers activity while the door is opened, the camera unit also including a clock recording the date and the length of time the door is kept open, the movie film thus clearly also showing if a package is removed from the chute after being deposited, and a long time opened door being regarded with suspicion.

FIG. 3 shows a typical film frame showing in addition to a picture of the customer and deposit in the chute, also the time of the picture.

FIG. 4 shows another design in which two auxilliary still cameras are spaced away to each side, photographing the person the three cameras making it harder for the lens of all to be blocked out willfully.

Referrring now to the drawing in greater detail and more particularly to FIG. 1 thereof at this time, the reference numeral 10 represents a Zipeye apparatus according to the present invention for installation with a night depository 11 of a bank.

The depository includes an inclined chute 12 extending through a bank building wall 13, the outer end of the chute being closable by a hinged door 14 and the inner end of the chute extending down into a steel vault 15 having a hinged door 16 with combination lock 17 for being opened by bank personel. The door 14, pivoted on hinge 18, is normally held closed by a rotatable lock bolt 19 on the door engaging lock 20 and which can be unlocked by a bank customer 21 having a key for rotating the lock bolt, so that he can deposit a bag or package 22 containing money, checks or the like, and which he places in a hopper 23 attached to a rear side of the door, the hopper spilling the package into the chute when the door is pivoted closed again into automatically locked position. The door has a handle 24 for pivoting the door opened and closed.

The present invention includes a dual camera 25 mounted in the wall 13 and having a forwardly extending lens 26 for photographing a face of the customer making a deposit, and the camera also includes a lens 27 pointed down into the hopper so to photograph the package placed therein. A switch 28 pushed by the hopper actuates the camera.

In operative use, the camera is preferably operated at the instant that the door has been reclosed into locked position, at which instant the package has not yet started to slide out of the hopper so that it can be photographed. Also just before this instant, the door automatically relocks so it cannot be reopened suddenly and the package removed. Thus the camera records an unretrievable deposit. At the same time the lens 26 photographs the depositor. The photographs of the depositor and package are associated together by being along side each other on the film, for use if the film is re-checked later. Customers may be advised by the bank to properly position themselves for the picture in order to be properly identified with the deposit being made, and an identifying numeral upon the package to face upwardly so to be further identified and credited therewith.

While most persons seek an honest transaction, there is always a possibility of a dishonest person attempting some irregularity at the depository, and accordingly may wish to prevent being photographed by placing his hand in front of the lens 26 and thus not be identified. To overcome this situation, the lens 26 is hidden behind a one-way mirror 29 of relatively larger size so that its precise location is unknown, nor even if there is a camera. The mirror serves most persons to check on their own appearance for correctness. If a person places a hand anywhere against a front of the mirror it breaks an electric eye path 30 so to activate an electric circuit 31 and move solenoid operated lock pin 32 into a hole 33 of a bar 34 secured to the door 14, and thus prevents the door to be opened.

In a modified design of the invention, shown in FIG. 2, the above described dual camera 25 is substituted by movie cameras 35 and 36 for photographing the individual and also the package, so to take continuous pictures from the moment that the door 14 is opened until it is closed, thereby recording anything irregular that occurs during the entire time, such as removal of a package after already placing it in the hopper or the like.

FIG. 3 illustrates a fragment of movie film produced by cameras 35 and 36, the film also recording the date and time of day alongside the film frames as shown at 37, by means of a clock 38.

In still another design, shown in FIG. 3, auxilliary still cameras 39 and 40 are spaced far apart so to prevent an individual from reaching all to cover the lens, the cameras being pointed at an angle toward the subject.

Thus different designs of the invention are indicated, for foiling the activities of dishonest persons.

What is claimed is:

1. An apparatus incorporated with a bank night depository comprising in combination, an inclined chute through a bank wall, a door on an outer end of said chute, an inner end of said chute leading to a vault, a hopper mounted on an inner side of said door for receiving and retaining a deposit when said door is open said hopper permitting said deposit to slide down the chute after said door is closed in combination with means for photographing the depositor and deposit simultaneously as soon as the door is closed in further combination with second means responsive to closing of said door for actuating the first said means.

2. Apparatus as in claim 1 wherein the second said means comprises a switch which completes an electric circuit responsive to door closure.

* * * * *